United States Patent
Zhong et al.

(10) Patent No.: US 11,196,041 B2
(45) Date of Patent: Dec. 7, 2021

(54) POSITIVE ELECTRODE PLATE AND LITHIUM-ION SECONDARY BATTERY

(71) Applicant: Contemporary Amperex Technology Co., Limited, Ningde (CN)

(72) Inventors: Wei Zhong, Ningde (CN); Lingyan Jiang, Ningde (CN); Xiaoming Ge, Ningde (CN); Tao Liang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 16/767,893

(22) PCT Filed: Sep. 12, 2019

(86) PCT No.: PCT/CN2019/105727
§ 371 (c)(1),
(2) Date: May 28, 2020

(87) PCT Pub. No.: WO2020/063371
PCT Pub. Date: Apr. 2, 2020

(65) Prior Publication Data
US 2020/0388829 A1   Dec. 10, 2020

(30) Foreign Application Priority Data
Sep. 28, 2018 (CN) .......................... 201811136888.6

(51) Int. Cl.
| | | |
|---|---|---|
| *H01M 4/131* | (2010.01) | |
| *H01M 4/36* | (2006.01) | |
| *H01M 4/505* | (2010.01) | |
| *H01M 4/525* | (2010.01) | |
| *H01M 10/0525* | (2010.01) | |
| *H01M 4/02* | (2006.01) | |

(52) U.S. Cl.
CPC ........... *H01M 4/364* (2013.01); *H01M 4/505* (2013.01); *H01M 4/525* (2013.01); *H01M 10/0525* (2013.01); *H01M 2004/021* (2013.01); *H01M 2004/028* (2013.01)

(58) Field of Classification Search
CPC ...... H01M 4/364; H01M 4/505; H01M 4/525; H01M 10/0525; H01M 2004/021; H01M 2004/028; H01M 4/131; H01M 4/485; H01M 4/5825; H01M 4/1315; H01M 4/136; H01M 10/058; Y02E 60/10
See application file for complete search history.

(56) References Cited

U.S. PATENT DOCUMENTS

2018/0351201 A1* 12/2018 Zhamu .................. H01G 11/50

FOREIGN PATENT DOCUMENTS

| CN | 101136474 A | 3/2008 |
|---|---|---|
| CN | 103165935 A | 6/2013 |
| CN | 103515616 A | 1/2014 |
| CN | 103972471 A | 8/2014 |
| CN | 102064326 B | 1/2016 |
| CN | 102195032 B | 5/2016 |
| CN | 107768733 A | 3/2018 |
| CN | 108292751 A | 7/2018 |
| EP | 3363927 A1 | 8/2018 |
| JP | 2002100358 A | 4/2002 |
| JP | 2015046282 A | 3/2015 |
| WO | 2016104024 A1 | 6/2016 |

OTHER PUBLICATIONS

Machine translation of JP 2015-046282, retrieved from <www.espacenet.com> on Jun. 8, 2021.*
The Extended European search report dated Oct. 26, 2020 for European Application No. 19866164.7, 7 pages.
The First Official Action and search report dated May 25, 2020 for Chinese application No. 201811136888.6, 7 pages.
PCT International Search Report for PCT/CN2019/105727, dated Dec. 19, 2019, 12 pages.
The First Office Action for European Application No. 19866164.7, dated Jul. 8, 2021, 6 pages.
Zhang S S et al, "The low temperature performance of Li-ion batteries", Journal of Power Sources, vol. 115, No. 1, dated Mar. 27, 2003, 4 pages.

* cited by examiner

*Primary Examiner* — Cynthia K Walls
(74) *Attorney, Agent, or Firm* — Law Offices of Liaoteng Wang

(57) ABSTRACT

This application relates to a positive electrode plate and a lithium-ion secondary battery, wherein the positive electrode plate comprises a positive electrode current collector and a positive active material layer disposed on at least one surface of the positive electrode current collector, wherein the positive active material layer comprises a first positive active material $Li_{1+x}Ni_aMe_bM_{1-a-b}O_{2-y}A_y$ and a second positive active material $Li_{1+z}Mn_cZ_{2-c}O_{4-d}B_d$, and wherein the positive electrode plate satisfies: $0.04 \leq R \cdot P/C \leq 10$, wherein R is the resistance of the positive electrode plate, and the unit of R is $\Omega$; P is the packing density of the positive electrode plate, and the unit of P is $g/cm^3$; C is the single-side areal density of the positive electrode plate, the unit of C is $g/1540.25$ $mm^2$. The lithium-ion secondary battery in this application simultaneously has high safety performance, low-temperature kinetic performance, high-temperature cycle performance and high-temperature storage performance.

15 Claims, No Drawings

POSITIVE ELECTRODE PLATE AND LITHIUM-ION SECONDARY BATTERY

CROSS-REFERENCE TO RELATED APPLICATION

This application is a National Stage of International Application No. PCT/CN2019/105727, filed on Sep. 12, 2019, which claims priority to Chinese Patent Application No. 201811136888.6 entitled with "Positive electrode plate and lithium-ion secondary battery", filed on Sep. 28, 2018, both of which are incorporated herein by reference in their entireties.

TECHNICAL FIELD

The present application relates to the field of secondary battery technology, and in particular to a positive electrode plate and a lithium-ion secondary battery.

BACKGROUND

Lithium-ion secondary batteries can provide stable voltage and current, have a high-voltage platform, high energy density, and a wide temperature range, have no memory effect, and are environment-friendly and easy to carry. Therefore, it is widely used in various consumer electronics, electric vehicles, and mechanical equipment. In recent years, there have been increasing demands on safety performance and cycle performance of lithium-ion secondary batteries.

SUMMARY

The inventors have discovered that the safety performance of lithium-ion secondary batteries can be improved by formulating a mixed system of positive active material with a nickel-containing ternary positive electrode material and a spinel lithium manganese oxide. However, the addition of spinel lithium manganese oxide will cause the ion transmission performance of the positive electrode plate to decrease, which makes the low-temperature kinetic performance, high-temperature cycle performance, and high-temperature storage performance of lithium-ion secondary batteries using the mixed system of positive active material lower, unable to meet market requirements.

The inventors have conducted a lot of researches to improve the ion transmission performance of the positive electrode plate using a mixed system of positive active material with a nickel-containing ternary positive electrode material and a spinel lithium manganese oxide, so as to obtain a lithium-ion secondary battery having high safety performance, combining with low-temperature kinetic performance, high-temperature cycle performance, and high-temperature storage performance.

A first aspect of the present application provides a positive electrode plate comprising a positive electrode current collector and a positive active material layer disposed on at least one surface of the positive electrode current collector, wherein the positive active material layer comprises a first positive active material represented by Chemical Formula (1) and a second positive active material represented by Chemical Formula (2), $$Li_{1+x}Ni_aMe_bM_{1-a-b}O_{2-y}A_y \qquad \text{Chemical Formula (1)}$$

In Chemical Formula (1), $-0.1 \le x \le 0.2$, $0 < a < 1$, $0 < b < 1$, $0 < a+b < 1$, $0 \le y < 0.2$; Me and M are each independently one or more of Co, Mn, Fe, Cr, Ti, Zn, V, Al, Zr, and Ce; Me is different with M; and A is one or more of S, N, F, Cl, Br, and I.

$$Li_{1+z}Mn_cZ_{2-c}O_{4-d}B_d \qquad \text{Chemical Formula (2)}$$

In Chemical Formula (2), $-0.1 \le z \le 0.2$, $0 < c \le 2$, $0 \le d < 1$; Z is one or more of Ni, Fe, Cr, Ti, Zn, V, Al, Mg, Zr, and Ce; and B is one or more of S, N, F, Cl, Br, and I.

Among them, the positive electrode plate satisfies Formula (1), $$0.04 \le R \cdot P/C \le 10 \qquad \text{Formula (1)}$$

In Formula (1), R is the resistance of the positive electrode plate, and the unit of R is $\Omega$; P is the packing density of the positive electrode plate, and the unit of P is $g/cm^3$; C is the single-side areal density of the positive electrode plate, the unit of C is $g/1540.25\ mm^2$.

A second aspect of the present application provides a lithium-ion secondary battery comprising a positive electrode plate, a negative electrode plate, a separator, and an electrolyte, wherein the positive electrode plate is the positive electrode plate according to the first aspect of the present application.

In the positive electrode plate and the lithium-ion secondary battery provided in this application, since the positive active material layer comprises a first positive active material and a second positive active material and the positive electrode plate satisfies $0.04 \le R \cdot P/C \le 10$, the lithium-ion secondary battery simultaneously has higher safety performance, low-temperature kinetic performance, high-temperature cycle performance, and high-temperature storage performance.

DETAILED DESCRIPTION

In order to make the object, technical solution, and technical effects of the present application apparent, the following further describes the present application in detail with reference to the embodiments. It should be understood that the embodiments described in the present description are only for explaining the present application, and are not intended to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description of the present application, it is to be noted that unless otherwise stated, the words "above" and "below" are inclusive of the case where it is equal to, and the word "more" in fragment "one or more" means two or more.

The above contents of the application are not intended to describe each and every example or embodiment disclosed herein. More exemplary embodiments will be described below in more details by way of examples. At a plurality of places throughout the present application, a series of examples are provided to give teachings, and these examples can be combined in any way, if possible. In each example, the exemplification is just for illustrative purpose, and shall not be interpreted as enumeration Positive Electrode Plate An embodiment of the present application provides a positive electrode plate comprising a positive electrode current collector and a positive active material layer disposed on at least one surface of the positive electrode current collector. As an example, the positive electrode current collector has two surfaces facing in the thickness direction of the positive electrode current collector, and the positive active material layer is laminated on one or both of the two surfaces of the positive electrode current collector. The positive active material layer contains a positive active material, and can perform reversible deintercalation/intercalation of lithium ions during operation. The positive current collector collects and outputs the generated current.

The positive active material comprises a first positive active material and a second positive active material.

The first positive active material is a compound represented by Chemical Formula (1):

$$Li_{1+x}Ni_aMe_bM_{1-a-b}O_{2-y}A_y \qquad \text{Chemical Formula (1)}$$

In Chemical Formula (1), $-0.1 \leq x \leq 0.2$, $0<a<1$, $0<b<1$, $0<a+b<1$, $0 \leq y<0.2$; Me and M are each independently one or more of Co, Mn, Fe, Cr, Ti, Zn, V, Al, Zr, and Ce; Me is different with M; and A is one or more of S, N, F, Cl, Br, and I Optionally, in Chemical Formula (1), $0.5 \leq a<1$, and Me and M are each independently one or more of Co, Mn, and Al.

The second positive active material is a compound represented by Chemical Formula (2):

$$Li_{1+z}Mn_cZ_{2-c}O_{4-d}B_d \qquad \text{Chemical Formula (2)}$$

In Chemical Formula (2), $-0.1 \leq z \leq 0.2$, $0<c \leq 2$, $0 \leq d<1$; Z is one or more of Ni, Fe, Cr, Ti, Zn, V, Al, Mg, Zr, and Ce; and B is one or more of S, N, F, Cl, Br, and I.

In addition, the technical parameter r of the positive electrode plate satisfies: $r=R \cdot P/C$, and $0.04 \leq R \cdot P/C \leq 10$.

Among them, R is the resistance of the positive electrode plate, in Ω; P is the packing density of the positive electrode plate, in g/cm³; C is the single-side areal density of the positive electrode plate, in g/1540.25 mm².

In the present application, the calculation of R·P/C only involves the calculation of numerical values. For example, if the resistance R of the positive electrode is 0.13Ω, the packing density P of the positive electrode plate is 3.20 g/cm³, and the single-side areal density C of the positive electrode plate is 0.400 g/1540.25 mm², then R·P/C=0.13× 3.20/0.400=1.04.

The resistance R of the positive electrode plate is the resistance of the positive electrode plate measured when direct current two-probe method is used and the contact area between the probe and the positive electrode plate is 497c mm². As an example, the upper and lower sides of the positive electrode plate are clamped between two conductive terminals of a resistance tester for electrode plate, and a pressure is applied to fix the electrode plate, then the resistance R of the positive electrode plate is measured, wherein the conductive terminal having a diameter of 14 mm, the applied pressure is 15 MPa~27 MPa. The resistance tester for electrode plate is, for example, a HIOKI BT3562 internal resistance tester.

The single-side areal density C of the positive electrode plate can be calculated by the formula C=1540.25*m/A_r, wherein m is the weight of the positive active material layer and the unit of m is g; $A_r$ is the area of the positive active material layer and the unit of $A_r$ is mm².

The packing density P of the positive electrode plate can be calculated by the formula P=m/v, wherein m is the weight of the positive active material layer and the unit of m is g; v is the volume of the positive active material layer and the unit of v is cm³. The volume v of the positive active material layer may be the product of the area Ar of the positive active material layer and the thickness of the positive active material layer.

The positive electrode plate according to the embodiments of the present application can fully exert the synergistic effect between the first positive active material and the second positive active material, so that the positive active material has high structural stability, and the side reaction of the electrolyte on the surface of the positive active material can be significantly reduced, effectively suppressing gas production and reducing heat production. At the same time, the positive electrode plate also has high electron and ion transmission performance. The positive electrode plate according to the embodiments of the present application can effectively improve the safety performance, low-temperature kinetic performance, high-temperature cycle performance and high temperature storage performance of the lithium-ion secondary battery on the premise that the lithium-ion secondary battery has a high specific capacity and energy density.

In the positive electrode plate according to the embodiments of the present application, the synergistic effect between the first positive active material and the second positive active material can also effectively inhibit the polarization the first positive active material from increasing during the cycle, and reduce the Ginger-Taylor effect of the second positive active materials, thereby reducing the positive polarization. Therefore, capacity loss of the positive electrode is significantly reduced, thereby further improving the cycle performance of the lithium-ion secondary battery.

The positive electrode plate according to the embodiments of the present application has higher electron and ion transmission performance, and also enables the lithium-ion secondary battery to have higher rate performance and lower low-temperature DC internal resistance, thereby further improving the low-temperature kinetic performance of the lithium-ion secondary battery.

Therefore, by adopting the positive electrode plate according to the embodiments of the present application, the lithium-ion secondary battery can simultaneously achieve high safety performance, low-temperature dynamic performance, high-temperature cycle performance, and high-temperature storage performance.

In addition, the resistance, packing density, and single-side areal density of the positive electrode plates are all key technical parameters in the design and manufacture of lithium-ion secondary batteries. When the resistance of the positive electrode plate is increased, the rate performance and cycle performance of the lithium-ion secondary battery are reduced. If the packing density of the positive electrode plate is too large or too small, the rate performance and cycle performance of the battery will be deteriorated. If the single-side areal density of the positive electrode plate is too large, the cycle life of the battery will be reduced, and the rate performance of the battery will be affected, especially the discharge capacity of the battery will be reduced at a high rate. If the single-side areal density of the positive electrode plate is too small, with the same battery capacity, the length of the current collector and the separator will increase, and the ohmic internal resistance of the battery will increase. This requires that these parameters can be comprehensively monitored and judged during the design and manufacture of a battery. The technical parameter r proposed in the present application mainly reflects the characteristics of the positive electrode plate itself, and is used to monitor and judge the design and manufacture of the positive electrode plate, which can ensure that the positive electrode plate reaches the expected design value, so that the electrochemical performance of the lithium-ion secondary battery can achieve the desired effect.

By unifying the resistance, packing density, and single-side areal density of the positive electrode plate into one technical parameter r, it is also beneficial to formulate an industry standards.

Further preferably, the technical parameter r of the positive electrode plate satisfies: $0.5 \leq r \leq 8$.

The resistance R of the positive electrode plate is preferably $R < 5\Omega$, and more preferably $R \leq 1\Omega$. This is beneficial to improve the rate performance and cycle performance of the lithium-ion secondary battery.

The packing density P of the positive electrode plate is preferably $2.6 \text{ g/cm}^3 \leq P \leq 3.5 \text{ g/cm}^3$. This facilitates the migration of electrons and ions in the positive electrode plate, thereby improving the rate performance and cycle performance of the lithium-ion secondary battery.

The single-side areal density C of the positive electrode plate is preferably $0.25 \text{ g/1540.25 mm}^2 \leq C \leq 0.40 \text{ g/1540.25 mm}^2$. This can improve the rate performance and cycle performance of the lithium-ion secondary battery while ensuring the charge and discharge capacity.

The thickness of the positive active material layer is preferably 116 μm to 185 μM, and more preferably 116 μm to 149 μm. This is beneficial to the cathode electrode to obtain a lower resistance, and to ensure that the battery has a higher charge and discharge capacity.

In the positive active material, the weight ratio of the first positive active material and the second positive active material is preferably 0.05:1 to 19:1, further preferably 0.4:1 to 19:1, and more preferably 1:1 to 4:1. Such positive active material has higher structural stability, and side reactions of the electrolyte on the surface of the positive active material is further reduced. In addition, such positive active material can also reduce the dissolution of manganese. On the one hand, it can reduces the positive electrode capacity loss and the increase of the positive electrode resistance caused by the structural destruction of the positive active material. On the other hand, it reduces the negative electrode impedance increase and lithium precipitation of the negative electrode caused by the dissolved manganese deposited on the surface of negative electrode. Therefore, the positive electrode plate using the positive active material can better improve the safety performance, low-temperature dynamic performance, high-temperature cycle performance, and high-temperature storage performance of the lithium-ion secondary battery.

Preferably, the second positive active material is present in an amount of 4 wt % to 95 wt %, and more preferably 4 wt % to 67 wt %, in the positive active material layer is preferably.

Preferably, the positive active material has an average particle diameter Dv50 of 4 μm to 18 μm and an average particle diameter Dv90 of 10 μm to 24 μm. More preferably, the average particle diameter Dv50 of the first positive active material is 8 μm to 16 μm and the average particle diameter Dv90 is 10 μm to 20 μm.

The average particle diameter Dv50 of the second positive active material is preferably 8 μm to 20 μm and the average particle diameter Dv90 is preferably 14 μm to 35 μm. More preferably, the average particle diameter Dv50 of the second positive active material is 11 μm to 16 μm and the average particle diameter Dv90 is 18 μm to 30 μm.

The use of the first positive active material and the second positive active material having the above-mentioned particle size distribution can further improve the electron and ion transmission performance of the positive electrode plate, thereby further improving the low-temperature kinetic performance and high-temperature cycling performance of the lithium-ion secondary battery.

Preferably, the first positive active material has a BET specific surface area of $0.4 \text{ m}^2/\text{g}$ to $1 \text{ m}^2/\text{g}$, more preferably $0.5 \text{ m}^2/\text{g}$ to $0.6 \text{ m}^2/\text{g}$.

The BET specific surface area of the second positive active material is preferably $0.4 \text{ m}^2/\text{g}$ to $0.7 \text{ m}^2/\text{g}$, and more preferably $0.5 \text{ m}^2/\text{g}$ to $0.7 \text{ m}^2/\text{g}$.

In the positive electrode plate according to the embodiments of the present application, the positive active material layer may further comprise a conductive agent and/or a binder. The present application does not specifically limit the types of the conductive agent and the binder, and it may be selected according to actual needs.

As an example, the conductive agent of the positive active material layer may be one or more of graphite, superconducting carbon, acetylene black, carbon black, Ketjen black, carbon dots, carbon nanotubes, graphene, and carbon nanofibers. The binder of the positive active material layer may be one or more of styrene-butadiene rubber (SBR), water-based acrylic resin, carboxymethyl cellulose (CMC), polyvinylidene fluoride (PVDF), polytetrafluoroethylene (PTFE)), polyvinyl butyral (PVB), ethylene-vinyl acetate copolymer (EVA), and polyvinyl alcohol (PVA).

In some alternative embodiments, the mass ratio of the conductive agent to the positive active material is greater than or equal to 1.5:95.5. This is beneficial to obtain a lower positive electrode plate resistance.

In some alternative embodiments, the weight percentage of the binder in the positive active material layer is less than or equal to 2 wt %. This is beneficial to obtain a lower positive electrode plate resistance.

The positive electrode current collector may be a metal foil or a porous metal plate, for example, a foil or a porous plate using a metal such as aluminum, copper, nickel, titanium, or silver, or an alloy thereof, such as aluminum foil.

The thickness of the positive electrode current collector is preferably 5 μm to 20 μm, further preferably 6 μm to 18 μm, and more preferably 8 μm to 16 μm.

Next, a method for preparing a positive electrode plate provided in the embodiments of the present application is described.

The positive electrode plate of the present application can be prepared by a coating method. For example, a positive electrode slurry is first coated on at least one surface of the positive electrode current collector to obtain a coating layer of positive active material, and then, after drying, cold pressing, etc., obtaining a positive electrode current collector having the positive active material layer thereon, i.e. obtaining a positive electrode plate.

In some embodiments, a method for preparing a positive electrode plate provided in the embodiments of the present application includes the following steps:

S100: Mixing a positive active material, a binder, a conductive agent, and a solvent according to a predetermined ratio, and stirring the mixture into a uniform system to obtain a positive electrode slurry, wherein the solvent may be N-methylpyrrolidone (NMP).

In step S100, the positive active material comprises a first positive active material and a second positive active material described above. Among them, the first positive active material and the second positive active material may be added at the same time, or they may be added in order; the first positive active material and the second positive active material may be added independently at one time, and of course they may be added separately in batches.

In some preferred embodiments, a first positive active material is first mixed with a binder, a conductive agent, and an organic solvent to make a stable pre-slurry; and then a second positive active material is added to the pre-slurry. The mixture was stirred and mixed to prepare a positive electrode slurry. In this way, the particles in the positive active material layer can be uniformly distributed, and the conductive agent can be prevented from agglomerating, thereby forming a uniformly distributed conductive network. Therefore, the resistance of the positive electrode plate is greatly reduced, and the dynamic performance and cycle performance of the battery can be improved.

In step S100, other additives such as lithium carbonate $Li_2CO_3$ may also be added. Adding lithium carbonate can further improve the battery's overcharge performance. When lithium carbonate is added in step S100, the added amount can satisfy that the weight percentage of lithium carbonate in the positive active material layer is 1 wt % to 5 wt %, such as 1 wt % to 1.5 wt %.

In step S100, the method and device known in the art can be used to stir the mixture. For example, the materials are added to a vacuum mixer for stirring and mixing, and the vacuum pressure is −20 KPa or less (gauge pressure). In the viscosity adjustment step of the stirring process, the common rotation rate is 20 RPM to 30 RPM and the autorotation rate is 1100 RPM to 1300 RPM. For example, the common rotation rate is 25 RPM and the autorotation rate is 1200 RPM. The whole stirring process takes 4 h to 7 h. Among them, RPM (Revolutions Per Minute) is the number of revolutions per minute.

The viscosity of the positive electrode slurry is preferably 5,000 mPa·s or more, for example, 5000 mPa·s to 7000 mPa·s, and for example, 5000 mPa·s to 6000 mPa·s.

The density of the positive electrode slurry is preferably greater than 1.25 kg/L. This is beneficial to make the slurry more uniform and the conductive agent is not easy to agglomerate, which is conducive to making the battery have higher rate performance and cycle performance.

S200: Coating the positive electrode slurry uniformly on the positive electrode current collector to obtain an initial positive electrode plate.

S300: Subjecting the initial positive electrode plate to drying, cold-pressing and other processes to obtain a positive electrode plate.

In some alternative embodiments, the initial positive electrode plate may be transferred to an oven for drying, and the drying temperature is 120° C. to 140° C., such as 130° C.

The cold pressing process can be performed using method and device known in the art, and those skilled in the art can select it according to the requirement of the packing density P of the positive electrode plate.

The positive electrode plate according to the embodiments of the present application can be realized by the above preparation method.

Lithium-Ion Secondary Battery

An embodiment of the present application further provides a lithium-ion secondary battery, comprising a positive electrode plate, a negative electrode plate, a separator, and an electrolyte.

The positive electrode plate adopts any one of the positive electrode plate provided in the embodiments of the present application.

The negative electrode plate may be a metallic lithium sheet, or may comprise a negative electrode current collector and a negative active material layer disposed on at least one surface of the negative electrode current collector.

The negative active material layer usually contains a negative active material and optional conductive agent, binder, and thickener. As an example, the negative active material may be one or more of natural graphite, artificial graphite, mesophase micro carbon sphere (MCMB), hard carbon, soft carbon, silicon, silicon-carbon composite, SiO, Li—Sn alloy, Li—Sn—O alloy, Sn, SnO, $SnO_2$, spinel-type lithium titanate $Li_4Ti_5O_{12}$, Li—Al alloy and lithium metal; the conductive agent of the negative active material layer may be one or more of graphite, superconducting carbon, acetylene black, carbon black, ketjen black, carbon dots, carbon nanotubes, graphene, and carbon nanofibers; the binder of the negative active material layer may be one or more of styrene-butadiene rubber (SBR), polyvinylidene fluoride (PVDF), polytetrafluoroethylene (PTFE), polyvinyl butyral (PVB), water-dispersible acrylic resin and carboxymethyl cellulose (CMC); the thickener of the negative active material layer may be carboxymethyl cellulose (CMC). However, the present application is not limited to these materials, and other materials such as negative active materials, conductive agents, binders, and thickeners commonly used for lithium-ion secondary batteries can also be used in the present application.

The negative electrode current collector can be made of a metal foil or a porous metal sheet, for example, a foil or a porous sheet made of a metal such as copper, nickel, titanium, or iron, or an alloy thereof, such as copper foil.

The negative electrode plate can be prepared according to a conventional method in the art. The negative active material and optional conductive agent, binder and thickener are usually dispersed in a solvent. The solvent can be N-methylpyrrolidone (NMP) or deionized water to form a uniform negative electrode slurry. The negative electrode slurry is coated on the negative electrode current collector, and after drying, cold pressing and other processes, a negative electrode plate is obtained.

The separator is not particularly limited, and any well-known porous structure separator having electrochemical stability and chemical stability can be selected. For example, the separator is a single-layer or multilayer film selected from one or more of glass fiber, non-woven fabric, polyethylene (PE), polypropylene (PP), and polyvinylidene fluoride (PVDF).

The electrolyte comprises an organic solvent and a lithium salt. The present application does not specifically limit the types of organic solvent and lithium salt, and they can be selected according to actual needs.

As an example, the organic solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methylpropyl carbonate (MPC), ethylpropyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethylsulfone (MSM), methylethylsulfone (EMS), and diethylsulfone (ESE), preferably two or more.

The lithium salt can be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorooxalatophosphate) and LiTFOP (lithium tetrafluorooxalate phosphate).

The electrolyte may optionally comprise an additive, which may be any additive that can be used for a lithium-ion secondary battery. Such additive is not specifically limited in the present application, and may be selected according to actual needs. As an example, the additive may be selected from one or more of vinylene carbonate (VC), vinyl ethylene carbonate (VEC), fluoroethylene carbonate (FEC), succinonitrile (SN), adiponitrile (ADN), 1,3-propene sultone (PST), sulfonate cyclic quaternary ammonium salt, tris(trimethylsilyl) phosphate (TMSP), and tris (trimethylsilyl) borate (TMSB).

The above electrolyte may be prepared in accordance with a conventional method in the art. An electrolyte may be obtained by uniformly mixing a solvent, a lithium salt and optionally an additive. Here, the sequence in which the materials are added is not particularly limited. For example, an electrolyte may be obtained by adding a lithium salt and optionally an additive into an organic solvent and uniformly mixing. Here, the lithium salt may be first added into the solvent, and then the optional additive may be added into the solvent.

A positive electrode plate, a separator and a negative electrode plate are stacked in order, so that the separator is located between the positive electrode plate and the negative electrode plate to play a role of isolation, as such to obtain a battery core, or to obtain a battery core after winding. The battery is placed in a packaging case, then the electrolyte is injected and sealed to obtain a lithium-ion secondary battery.

Due to that the positive electrode plate according the embodiments of the present application is used, the lithium-ion secondary battery of the present application simultaneously has higher safety performance, low-temperature kinetic performance, high-temperature cycle performance, and high-temperature storage performance.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples are commercially available and used directly without further treatment, and the instruments used in the examples are commercially available.

Example 1

Preparation of Positive Electrode Plate

A first positive active material $LiNi_{0.5}Co_{0.2}Mn_{0.3}O_2$, a second positive active material $LiMn_2O_4$, a binder PVDF, a conductive carbon black, a conductive paste of carbon nanotube (CNT), and $Li_2CO_3$ were mixed at a mass ratio of 90.25:4.75:1.1:2.3:0.4:1.2 (i.e. $LiNi_{0.5}Co_{0.2}Mn_{0.3}O_2$: $LiMn_2O_4$:PVDF:conductive carbon black:CNT:$Li_2CO_3$), adding a solvent NMP, stirring under vacuum stirring to a uniform transparent system to obtain a positive electrode slurry. The viscosity of the positive electrode slurry was 5100 mPa·s, and the stirring time was 4 h. The positive electrode slurry was uniformly coated on a positive electrode current collector aluminum foil, and then the positive electrode current collector was transferred to an oven to dry at a drying temperature of 130° C., and then cold-pressed and slit to obtain a positive electrode plate. The weight percentage of the first positive active material $LiNi_{0.5}Co_{0.2}Mn_{0.3}O_2$ in the positive active material layer was 90.25 wt %, and the weight percentage of the second positive active material $LiMn_2O_4$ in the positive active material layer was 4.75 wt %.

Preparation of Negative Electrode Plate

A negative active material artificial graphite, a thickener sodium carboxymethyl cellulose (CMC), and a binder styrene butadiene rubber (SBR) were mixed at a mass ratio of 98:1:1, then a solvent deionized water was added, and the resulting mixture was stirred in a vacuum mixer to obtain a negative electrode slurry. The negative electrode slurry was uniformly coated on a negative electrode current collector copper foil; then the negative electrode current collector was transferred to an oven to dry at a drying temperature of 120° C., and then cold-pressed and cut to obtain a negative electrode plate.

Preparation of Electrolyte

Ethylene carbonate (EC), ethyl methyl carbonate (EMC) and diethyl carbonate (DEC) were mixed uniformly in a volume ratio of 1:1:1 to obtain an organic solvent. 1 mol/L $LiPF_6$ was dissolved in the organic solvent and mixed uniformly to obtain an electrolyte.

Preparation of Lithium-Ion Secondary Battery

The positive electrode plate, the separator, and the negative electrode plate were stacked in this order. A polypropylene (PP) film (type A273, provided by Celgard) having a thickness of 14 μm was used as a separator for taking an isolating action between the positive electrode plate and the negative electrode plate. Then the stack was wound into a square bare cell, and the electrode tabs were welded. The bare cell was packed into a casing, then the electrolyte was injected and sealed, and then it was subjected to the processes of standing, forming, and shaping to obtain a lithium-ion secondary battery.

Examples 2-9

Different from Example 1, the relevant parameters in the preparation steps of the positive electrode plate were adjusted, as shown in Table 1.

Comparative Example 1

Different from Example 1, the positive active material in the positive electrode plate contained only $LiMn_2O_4$.

Comparative Example 2

Different from Example 1, the positive active material in the positive electrode plate contained only $LiNi_{0.8}Co_{0.1}Mn_{0.1}O_2$.

Comparative Example 3

Different from Example 1, the weight percentages of the positive active material, conductive carbon black, and CNT in the positive active material layer of the positive electrode plate were 90 wt %, 5.7%, and 2 wt %, respectively.

Comparative Example 4

Different from Example 1, the viscosity of the positive electrode slurry was 4000 mPa·s, and the stirring time was 6 h.

Comparative Example 5

Different from Example 1, the viscosity of the positive electrode slurry was 4300 mPa·s, and the stirring time was 5.5 h.

Test Section (1) Test for Resistance R of Positive Pole Piece

A HIOKI BT3562 internal resistance tester was used to test the resistance of the positive electrode plate, including: clamping the positive electrode plate between the two conductive terminals of the internal resistance tester and applying pressure to fix the positive electrode plate, then measuring the resistance R of the positive electrode plate, wherein the diameter of the conductive terminal was 14 mm, the applied pressure was 15 MPa to 27 MPa, and the sampling time was in the range of 5 s to 17 s.

(2) High-Temperature Cycle Performance Test of Lithium-Ion Secondary Batteries

At 60° C., a lithium-ion secondary battery was charged at a constant current of 1C to a voltage of 4.2V, and then charge at a constant voltage until the current was 0.05C or less, and then discharged at a constant current of 1C to a voltage of 3.0V. This was a charge and discharge cycle. The discharge capacity of the first cycle of the lithium ion secondary battery was recorded. The lithium-ion secondary battery was subjected to charge/discharge cycles in accordance with the above method, the discharge capacity of each cycle was recorded, until the discharge capacity of the lithium-ion secondary battery was reduced to 80% of the discharge capacity of the first cycle, and then the number of charge and discharge cycles was recorded.

(3) Rate Performance Test of Lithium-Ion Secondary Battery

At 25° C., the lithium-on secondary battery was charged at a constant current of 0.33C to a voltage of 4.2V, and charged at a constant voltage to a current of 0.05C or less, and then was allowed to stand for 30 minutes, and then discharged again to 3.0V at a constant current of 1C. Thus, the 1C rate discharge capacity of the lithium-ion secondary battery was measured.

At 25° C., the lithium-ion secondary battery was charged at a constant current of 0.33C to a voltage 4.2V, and then charge at a constant voltage to a current of 0.05C or less, and then was allowed to stand for 30 minutes, and then discharged again to 3.0V at a constant current of 3C. Thus, the 3C rate discharge capacity of the lithium-ion secondary battery was measured.

Lithium-ion secondary battery 3C rate discharge capacity retention ratio (%)=3C rate discharge capacity/1C rate discharge capacity×100%.

(4) High-Temperature Storage Performance Test of Lithium-Ion Secondary Battery

At 25° C., the lithium ion secondary battery was charged at a constant current of 0.33C to a voltage 4.2V, then charged at a constant voltage to a current of 0.05C or less, and then discharge at a constant current of 0.33C to a voltage 3.0V. The initial discharge capacity of the lithium ion secondary battery was tested.

At 25° C., the lithium-ion secondary battery was charged at a constant current of 0.33C to a voltage 4.2V, and then charged at a constant voltage to a current of 0.05C or less. Then, the fully-charged lithium-ion secondary battery was place in an oven at 60° C. for 60 days.

After storage at high temperature for 60 days, the lithium-ion secondary battery was naturally cooled down to 25° C. Then, the battery was discharged at a constant current of 0.33C to a voltage of 3.0 V, and charged at a constant current of 0.33C to a voltage of 4.2 V, then charged again at a constant voltage until the current was 0.05C or less, and then discharged again at a constant current of 0.33C to a voltage of 3.0 V. Thus, the discharge capacity of the lithium-ion secondary battery after storage at high temperature for 60 days was tested.

The capacity retention ratio (%) of the lithium-ion secondary battery after storage at high temperature for 60 days=discharge capacity after storage at high temperature for 60 days/initial discharge capacity×100%.

(5) Low-Temperature DC Internal Resistance (DCR) Performance Test of Lithium-Ion Secondary Batteries At 25° C., the lithium-ion secondary battery was charged at a constant current of 1C to a voltage 4.2V, then charged at a constant voltage to a current of 0.05C or less, and then discharged at a constant current of 1C. The state of charge (SOC) was adjusted to 50% of the full charged capacity, and then the temperature of the lithium-ion secondary battery was adjusted to −25° C., and then the lithium-ion secondary battery was allowed to stand for 2 hours, and then discharged at a constant current of 0.36C for 10 seconds. Thus, the DCR value was tested.

The test results of Examples 1 to 9 and Comparative Examples 1 to 5 were shown in Table 2.

TABLE 1

| | Positive active material | Weight percentage of the first positive active material wt % | Weight percentage of the second positive active material wt % | single-side areal density C of the positive electrode plate g/1540.25 mm$^2$ | Packing density P of the positive electrode plate g/cm$^3$ | Resistance R of the positive electrode plate Ω |
|---|---|---|---|---|---|---|
| Example 1 | LiNi$_{0.5}$Co$_{0.2}$Mn$_{0.3}$O$_2$/ LiMn$_2$O$_4$ | 90.25 | 4.75 | 0.400 | 3.30 | 0.06 |
| Example 2 | LiNi$_{0.5}$Co$_{0.2}$Mn$_{0.3}$O$_2$/ LiMn$_2$O$_4$ | 76.00 | 19.00 | 0.400 | 3.20 | 0.13 |
| Example 3 | LiNi$_{0.5}$Co$_{0.2}$Mn$_{0.3}$O$_2$/ LiMn$_2$O$_4$ | 52.25 | 42.75 | 0.300 | 3.10 | 0.96 |
| Example 4 | LiNi$_{0.5}$Co$_{0.2}$Mn$_{0.3}$O$_2$/ LiMn$_2$O$_4$ | 47.50 | 47.50 | 0.302 | 3.30 | 0.41 |

TABLE 1-continued

| | Positive active material | Weight percentage of the first positive active material wt % | Weight percentage of the second positive active material wt % | single-side areal density C of the positive electrode plate g/1540.25 mm$^2$ | Packing density P of the positive electrode plate g/cm$^3$ | Resistance R of the positive electrode plate Ω |
|---|---|---|---|---|---|---|
| Example 5 | $LiNi_{0.5}Co_{0.2}Mn_{0.3}O_2$/ $LiMn_2O_4$ | 28.50 | 66.50 | 0.392 | 3.00 | 0.005 |
| Example 6 | $LiNi_{0.5}Co_{0.2}Mn_{0.3}O_2$/ $LiMn_2O_4$ | 28.50 | 6.50 | 0.320 | 3.03 | 0.51 |
| Example 7 | $LiNi_{0.5}Co_{0.2}Mn_{0.3}O_2$/ $LiMn_2O_4$ | 28.50 | 66.50 | 0.310 | 3.03 | 0.73 |
| Example 8 | $LiNi_{0.8}Co_{0.1}Mn_{0.1}O_2$/ $LiMn_2O_4$ | 28.50 | 66.50 | 0.302 | 3.03 | 0.57 |
| Example 9 | $LiNi_{0.8}Co_{0.1}Mn_{0.1}O_2$/ $LiMn_2O_4$ | 66.50 | 28.50 | 0.263 | 3.03 | 0.41 |
| Comparative Example 1 | $LiMn_2O_4$ | / | 95.00 | 0.380 | 2.85 | 2.65 |
| Comparative Example 2 | $LiNi_{0.8}Co_{0.1}Mn_{0.1}O_2$ | 95.00 | / | 0.315 | 3.50 | 2.00 |
| Comparative Example 3 | $LiNi_{0.5}Co_{0.2}Mn_{0.3}O_2$/ $LiMn_2O_4$ | 29.00 | 61.00 | 0.400 | 2.86 | 0.004 |
| Comparative Example 4 | $LiNi_{0.5}Co_{0.2}Mn_{0.3}O_2$/ $LiMn_2O_4$ | 28.50 | 66.50 | 0.400 | 3.00 | 2.40 |
| Comparative Example 5 | $LiNi_{0.8}Co_{0.1}Mn_{0.1}O_2$/ $LiMn_2O_4$ | 28.50 | 66.50 | 0.335 | 3.03 | 2.85 |

In Table 1, the weight percentage of the first positive active material and the weight percentage of the second positive active material were based on the total weight of the positive active material layer.

TABLE 2

| | R · P/C | Rate performance/% | Number of high-temperature cycles | High-temperature storage performance/% | Low-temperature DCR/mΩ |
|---|---|---|---|---|---|
| Example 1 | 0.50 | 95 | 789 | 91.0 | 652.0 |
| Example 2 | 1.04 | 95 | 664 | 90.0 | 659.0 |
| Example 3 | 9.92 | 92 | 456 | 88.0 | 666.0 |
| Example 4 | 4.48 | 92 | 420 | 88.0 | 675.0 |
| Example 5 | 0.04 | 94 | 280 | 86.2 | 686.7 |
| Example 6 | 4.83 | 95 | 310 | 87.2 | 706.1 |
| Example 7 | 7.14 | 94 | 300 | 86.5 | 690.0 |
| Example 8 | 5.72 | 93 | 230 | 87.0 | 346.0 |
| Example 9 | 4.72 | 90 | 446 | 88.8 | 327.5 |
| Comparative Example 1 | 19.88 | 85 | 130 | 76.9 | 732.1 |
| Comparative Example 2 | 22.22 | 87 | 150 | 77.6 | 370.0 |
| Comparative Example 3 | 0.03 | 87 | 240 | 83.0 | 720.0 |
| Comparative Example 4 | 18.00 | 85 | 200 | 85.0 | 730.0 |
| Comparative Example 5 | 25.78 | 88 | 90 | 80.0 | 358.0 |

It can be known from the above examples and comparative examples that when the positive active material of the positive electrode plate was a mixed system of the first positive active material and the second positive active material, and the positive electrode plate meets 0.04≤R·P/C≤10, the safety performance of the lithium-ion secondary battery was improved, at the same time the low-temperature kinetic performance, high-temperature storage performance, and high-temperature cycle performance of the lithium-ion secondary battery were also improved. When R·P/C<0.04 and when R·P/C>10, the rate performance of the lithium-ion secondary battery was low and the low-temperature DCR was high, which affected the low-temperature kinetic performance and the high temperature of the battery. Storage performance and high-temperature cycle performance had also deteriorated significantly.

The above mentioned descriptions only show particular implementations of the present application and but are not intended to limit the protection scope of the present application. Any modification or replacement readily figured out by a person skilled in the art within the technical scope disclosed in the present invention shall fall within the protection scope of the present application. Therefore, the protection scope of the present invention shall be determined by the protection scope of the claims.

What is claimed is:

1. A positive electrode plate comprising a positive electrode current collector and a positive active material layer disposed on at least one surface of the positive electrode current collector, wherein the positive active material layer comprises a first positive active material represented by Chemical Formula (1) and a second positive active material represented by Chemical Formula (2), $$Li_{1+x}Ni_aMe_bM_{1-a-b}O_{2-y}A_y \quad \text{Chemical Formula (1),}$$

in Chemical Formula (1), $-0.1 \leq x \leq 0.2$, $0 < a < 1$, $0 < b < 1$, $0 < a+b < 1$, $0 \leq y < 0.2$; Me and M are each independently one or more of Co, Mn, Fe, Cr, Ti, Zn, V, Al, Zr, and Ce; Me is different with M; and A is one or more of S, N, F, Cl, Br, and I;

$$Li_{1+z}Mn_cZ_{2-c}O_{4-d}B_d \quad \text{Chemical Formula (2)}$$

in Chemical Formula (2), $-0.1 \leq z \leq 0.2$, $0 < c \leq 2$, $0 \leq d < 1$; Z is one or more of Ni, Fe, Cr, Ti, Zn, V, Al, Mg, Zr, and Ce; and B is one or more of S, N, F, Cl, Br, and I; and wherein the positive electrode plate satisfies Formula (1), $$0.04 \leq R \cdot P/C \leq 10 \quad \text{Formula (1)}$$

in Formula (1), R is the resistance of the positive electrode plate, and the unit of R is Ω; P is the packing density of the positive electrode plate, and the unit of P is g/cm³; C is the single-side areal density of the positive electrode plate, the unit of C is g/1540.25 mm².

2. The positive electrode plate according to claim 1, wherein the positive electrode plate satisfies Formula (2), $$0.5 \leq R \cdot P/C \leq 8 \quad \text{Formula (2).}$$

3. The positive electrode plate according to claim 1, wherein the resistance R of the positive electrode plate is less than 5Ω.

4. The positive electrode plate according to claim 1, wherein the packing density P of the positive electrode plate is from 2.6 g/cm³ to 3.5 g/cm³.

5. The positive electrode plate according to claim 1, wherein the single-side areal density C of the positive electrode plate is from 0.25 g/1540.25 mm² to 0.40 g/1540.25 mm².

6. The positive electrode plate according to claim 1, wherein a weight ratio of the first positive active material and the second positive active material is 0.05:1 to 19:1.

7. The positive electrode plate according to claim 1, wherein the second positive electrode active material is present in an amount of 4 wt % to 95 wt % in the positive active material layer.

8. The positive electrode plate according to claim 1, wherein:
the first positive active material has an average particle diameter Dv50 of 4 μm to 18 μm, and has an average particle diameter Dv90 of 10 μm to 24 μm; and/or,
the second positive active material has an average particle diameter Dv50 of 8 μm to 20 μm, and has an average particle diameter Dv90 of 14 μm to 35 μm.

9. The positive electrode plate according to claim 1, wherein in Chemical Formula (1), $0.5 \leq a < 1$, Me and M are each independently one or more of Co, Mn, and Al.

10. A lithium-ion secondary battery comprising a positive electrode plate according to claim 1, a negative electrode plate, a separator, and an electrolyte.

11. The positive electrode plate according to claim 1, wherein the resistance R of the positive electrode plate is 1Ω or less.

12. The positive electrode plate according to claim 1, wherein a weight ratio of the first positive active material and the second positive active material is 0.4:1 to 19:1.

13. The positive electrode plate according to claim 1, wherein the second positive electrode active material is present in an amount of 4 wt % to 67 wt % in the positive active material layer.

14. The positive electrode plate according to claim 8, wherein:
the first positive active material has an average particle diameter Dv50 of 8 μm to 16 μm, and has an average particle diameter Dv90 of 10 μm to 20 μm.

15. The positive electrode plate according to claim 8, wherein:
the second positive active material has an average particle diameter Dv50 of 11 μm to 16 μm, and has an average particle diameter Dv90 of 18 μm to 30 μm.

* * * * *